US008843010B2

(12) United States Patent
Okuno et al.

(10) Patent No.: US 8,843,010 B2
(45) Date of Patent: Sep. 23, 2014

(54) FIXATION UNIT AND IMAGE FORMING APPARATUS

(71) Applicant: Konica Minolta, Inc., Tokyo (JP)

(72) Inventors: Jinju Okuno, Toyohashi (JP); Toshihiro Wazumi, Hino (JP); Toru Komatsu, Tachikawa (JP)

(73) Assignee: Konica Minolta, Inc. (JP)

( * ) Notice: Subject to any disclaimer, the term of this patent is extended or adjusted under 35 U.S.C. 154(b) by 137 days.

(21) Appl. No.: 13/669,767

(22) Filed: Nov. 6, 2012

(65) Prior Publication Data

US 2013/0121716 A1 May 16, 2013

(30) Foreign Application Priority Data

Nov. 16, 2011 (JP) ................................ 2011-250276

(51) Int. Cl.
*G03G 15/20* (2006.01)
*B65G 13/06* (2006.01)

(52) U.S. Cl.
USPC ........................................................... 399/67

(58) Field of Classification Search
CPC ....... G03G 15/20; G03G 21/14; G03G 15/00; G03G 15/2053; B65G 13/06
USPC ............................................ 399/67; 198/789
See application file for complete search history.

(56) References Cited

U.S. PATENT DOCUMENTS

| | | | | |
|---|---|---|---|---|
| 2007/0258741 | A1* | 11/2007 | Kim et al. | 399/329 |
| 2011/0188907 | A1* | 8/2011 | Seki | 399/329 |

FOREIGN PATENT DOCUMENTS

| | | | |
|---|---|---|---|
| JP | 2-222980 | A | 9/1990 |
| JP | 2006-71727 | A | 3/2006 |
| JP | 2007-7537 | A | 1/2007 |
| JP | 2007-78992 | A | 3/2007 |
| JP | 2007-163946 | A | 6/2007 |
| JP | 2008-40420 | A | 2/2008 |
| JP | 2010-217232 | A | 9/2010 |
| JP | 2010-256696 | A | 11/2010 |

OTHER PUBLICATIONS

Notification of Reasons for Refusal for Japanese Patent Application No. 2011-250276, mailed Oct. 29, 2013, with English translation.

* cited by examiner

*Primary Examiner* — David Gray
*Assistant Examiner* — Travis Harper
(74) *Attorney, Agent, or Firm* — Cantor Colburn LLP

(57) ABSTRACT

A fixation unit which allows paper with a toner image formed thereon to be fed between a first roller and a second roller for fixing the toner image on the sheet. The fixation unit includes a drive controller. The drive controller rotates the first and second rollers on different driving conditions. The drive controller rotates the first roller at a constant circumferential speed at least in a state where the first and second rollers are in pressure contact with each other and rotates the second roller with a constant torque which is low enough for the second roller to stop rotating when the first roller stops rotating.

18 Claims, 9 Drawing Sheets

| TEMPERATURE SETTING[℃] | CIRCUMFERENTIAL SPEED [m/s] | | |
|---|---|---|---|
| | 350 | 400 | 450 |
| 200 | 120% | 110% | 100% |
| 180 | 110% | 100% | 90% |
| 160 | 100% | 90% | 80% |

FIG. 9

| | SEPARATION TIME | APPROACHING AND SEPARATING OPERATION TIME | PRESSURE CONTACT TIME | TIME TO CHANGE TO TORQUE OF PRESSURE CONTACT TIME |
|---|---|---|---|---|
| TWO-PHASE SWITCHING | 0.1N/m ※ | | 0.5N/m | CHANGE TORQUE AFTER APPROACHING OPERATION AND BEFORE SEPARATING OPERATION |
| THREE-PHASE SWITCHING | 0.05N/m ※ | 0.1N/m ※ | 0.5N/m | CHANGE TORQUE AFTER APPROACHING OPERATION AND BEFORE SEPARATING OPERATION |

※ TORQUE FOR SUBSTANTIALLY SAME CIRCUMFERENTIAL SPEED AS THAT OF FIRST ROLLER

FIG.10

| | SEPARATION TIME | APPROACHING AND SEPARATING OPERATION TIME | PRESSURE CONTACT TIME | TIME TO CHANGE TO TORQUE OF PRESSURE CONTACT TIME |
|---|---|---|---|---|
| TWO-PHASE SWITCHING | 450mm/s | | 0.5N/m | CHANGE TORQUE AFTER APPROACHING OPERATION AND BEFORE SEPARATING OPERATION |
| THREE-PHASE SWITCHING | 400m/s | 450mm/s | 0.5N/m | CHANGE TORQUE AFTER APPROACHING OPERATION AND BEFORE SEPARATING OPERATION |

※ CIRCUMFERENTIAL SPEED OF FIRST ROLLER IS 450 mm/s

FIXATION UNIT AND IMAGE FORMING APPARATUS

BACKGROUND OF THE INVENTION

1. Field of the Invention

The present invention relates to a fixation unit and an image forming apparatus.

2. Description of Related Art

In image forming apparatuses which form toner images on paper, one of widely-known fixation units nips paper, which supports an unfixed toner image, between rotary bodies such as facing rollers and a belt, and conveys the paper with pressure and heat applied thereto for fixation of the toner image on the paper.

If paper is nipped and subjected to the heat fixing process by such a fixation unit, the paper sometimes slips between the rotary bodies because of melting toner when the toner image formed on the paper includes a large amount of toner. For example, the degrees of slip of paper are different between a region of paper including toner (including much toner) and a region thereof including no toner (including a little toner). Accordingly, driving torque that can be transmitted from the driving rotary body to the driven rotary body is varied, thus causing failure called paper wrinkling that paper wrinkles.

There is a technique to prevent a pressure belt of the fixation unit from being reduced in speed by slip of paper (for example, see Japanese Patent Application Laid-Open Publication No. 02-222980) in the following manner. The pressure belt of the fixation unit is provided so as to be driven and rotated in the direction that the paper is conveyed through a one-way clutch, which allows free movement in the paper conveyance direction. Moreover, the circumferential speed of the pressure belt is set to not higher than the circumferential speed of the heating roller, thus stabilize the paper conveyance by the pressure belt and the heating roller.

By another one of known techniques (for example, see Japanese Patent Application Laid-open Publication No. 2006-71727), a driving torque giving means, which gives a photoreceptor drum a driving torque of a driving motor for driving a pair of fixing rollers, includes a torque limiter for stably giving the driving torque.

However, in the case of the aforementioned patent literature (Japanese Patent Application Laid-Open Publication No. 02-222980), because of use of the one-way clutch, auxiliary drive functions only when the speed of the pressure belt is reduced to a predetermined value or less, and on/off of the auxiliary drive depends on the average belt speed in the nip region. On the other hand, occurrence of the paper wrinkling is largely due to the presence or absence of toner images and the density thereof in the longitudinal direction of the nip region. Accordingly, the paper wrinkling occurs in some cases if the shear force that the paper receives from the belt varies in the longitudinal direction of the nip region even when the belt does not slip on average. Accordingly, this technique also cannot prevent the paper wrinkling.

In the case of the aforementioned patent literature (Japanese Patent Application Laid-Open Publication No. 2006-71727), if the circumferential speed of the belt is set lower enough than the circumferential speed of the roller when auxiliary driving force is given by the torque limiter, the auxiliary torque is always fixed to the torque limiting value, thus preventing the paper wrinkling to a certain extent. However, in the torque limiter which is in operation to limit the torque, slip is always caused. Accordingly, in the fixing process with large driving force, the aforementioned technique is impractical in the light of the loss of driving force and the durability of the torque limiter.

SUMMARY OF THE INVENTION

An object of the present invention is to provide a fixation unit and an image forming apparatus performing a fixing process which is less likely to cause paper wrinkling.

According to a first aspect of an embodiment of the present invention, there is provided a fixation unit which allows paper with a toner image formed thereon to be fed between a first roller and a second roller for fixing the toner image on the sheet. The fixation unit comprises a drive controller for rotating the first and second rollers on different driving conditions. The drive controller rotates the first roller at a constant circumferential speed at least in a state where the first and second rollers are in pressure contact with each other and rotates the second roller with a constant torque which is low enough for the second roller to stop rotating when the first roller stops rotating.

Preferably, when paper having a toner layer composed of toner adhering to the entire surface thereof is fed between the first roller rotating at a driving force Fp and the second roller driven to rotate in response to the rotation of the first roller, the second roller is rotated by the drive controller with a constant torque which produces auxiliary driving force Fu satisfying a relation of $Fp>Fu>Fp-Ft$ where Ft is a maximum force that can be transmitted from the first roller to the second roller through the sheet and the toner layer.

Preferably, concerning rotational drive of the first and second rollers, the drive controller rotates the first roller and the second roller on a driving condition satisfying a relation of (driving power for rotating the first roller)>(driving power for rotating the second roller)>(driving power for rotating the first roller)−(lower limit of driving power for the first roller that causes paper wrinkling).

Preferably, the fixation unit further comprises a torque distribution adjustment controller for adjusting proportions of torque distributed to the first and second rollers concerning rotational drive of the first and second rollers, wherein the drive controller rotates the second roller with a torque according to the proportions of torque adjusted by the torque distribution adjustment controller.

Preferably, each of the first and second rollers includes an elastic layer in the circumferential surface, and the elastic layer of the second roller is thicker than the elastic layer of the first roller, and the surface of the fed paper including the toner image thereon faces the second roller.

Preferably, the fixation unit further comprises: a heating roller for heating the second roller; and an endless belt member laid on the second roller and the heating roller, wherein the paper is fed between the first and second rollers with the belt member interposed therebetween.

Preferably, the fixation unit further comprises a torque correction controller for correcting a value of torque for rotationally driving the second roller concerning the rotational drive of the first and second roller, wherein the torque correction controller corrects a value of torque for rotationally driving the second roller based on at least one of toner melting data and roller drive load data which are stored in a predetermined storage unit in advance, and the drive controller rotates the second roller with the torque corrected by the torque correction controller.

Preferably, the fixation unit further comprises a torque correction controller for correcting a value of torque for rotationally driving the second roller concerning the rotational drive of the first and second rollers; and a load data detector for detecting the roller drive load data concerning rotational drive of the first or second roller, wherein the torque correction controller corrects the value of torque for rotationally driving the second roller based on the roller drive load data detected by the load data detector, and the drive controller rotates the second roller with the torque corrected by the torque correction controller.

Preferably, the drive controller rotates the second roller with different values of torque for rotationally driving the second roller in a state where the first and second rollers are in pressure contact with each other and a state where the first and second rollers are spaced apart from each other.

Preferably, the drive controller rotates the second roller with different values of torque for rotationally driving the second roller in a state where the first and second rollers are in pressure contact with each other, a state where the first and second rollers are spaced apart from each other, and a state where the first and second rollers are approaching and separating from each other.

According to a second aspect of an embodiment of the present invention, there is provided an image forming apparatus, comprising: any one of the above fixation unit; and an image forming section for forming the toner image on the paper.

BRIEF DESCRIPTION OF THE DRAWINGS

The present invention will be completely understood by the detailed description shown in the following and the accompanying drawings. However, these description and drawings do not limit the present invention. Herein.

FIG. 9 is an explanatory view concerning switching of torque control for rotating the second roller; and FIG. 10 is an explanatory view concerning switching of torque control and circumferential speed control for rotating the second roller.

DESCRIPTION OF THE PREFERRED EMBODIMENTS

Figure 1:
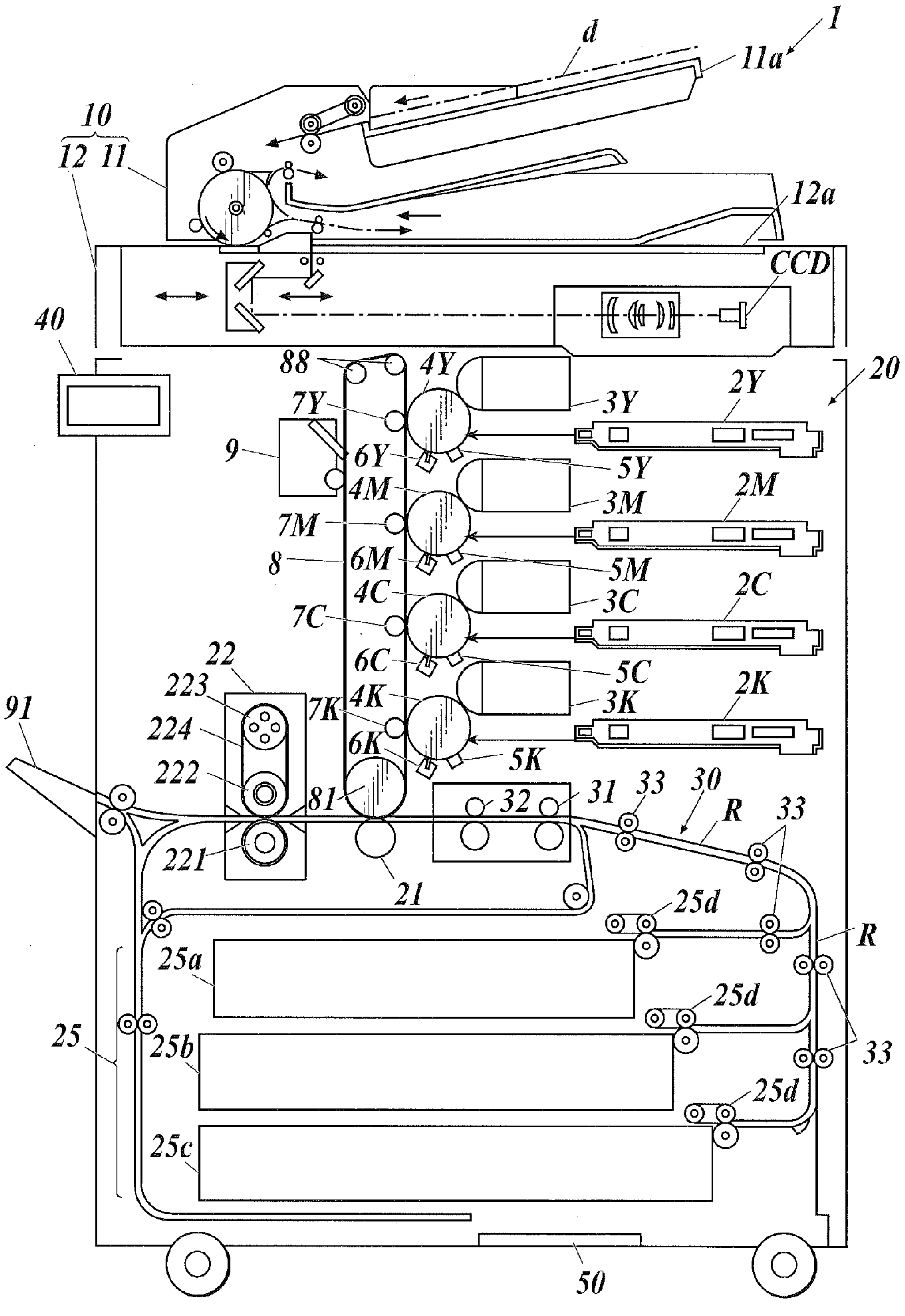
FIG. 1 is a schematic configuration view showing an image forming apparatus.

Hereinafter, a description is given of preferred embodiments for carrying out the present invention with reference to the drawings. The embodiments described below include various technically preferable limitations for carrying out the present invention. However, the scope of the invention is not limited to the following embodiment and examples shown in the drawings.

Embodiment 1

Figure 2:
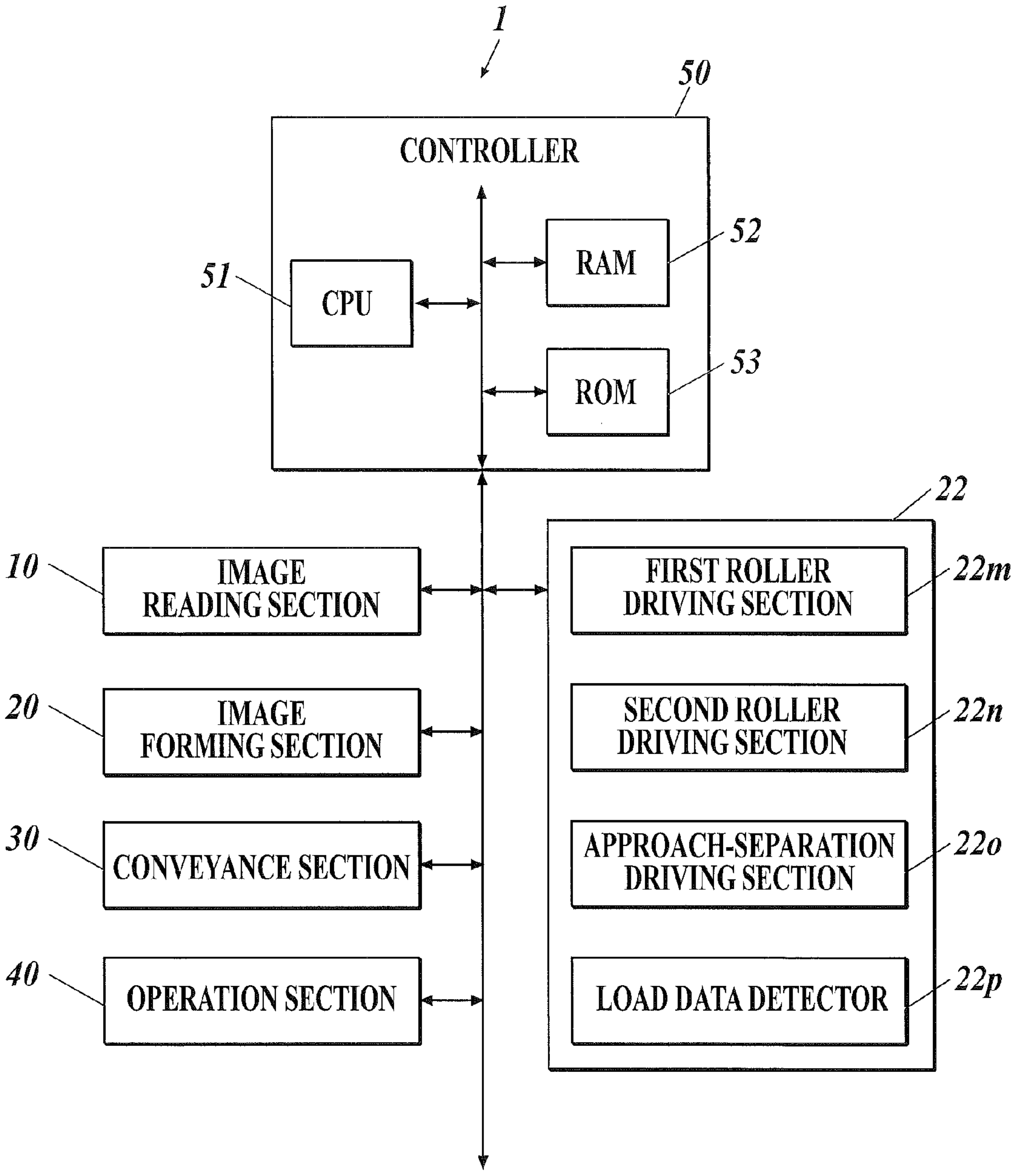
FIG. 2 is a block diagram showing a control system of the image forming apparatus.

FIG. 1 is a schematic configuration view showing an image forming apparatus 1. FIG. 2 is a block diagram showing a control system of the image forming apparatus 1.

The image forming apparatus 1 includes a copy function, a print function, and the like. The copy function is to read an image from a document, form an image based on the read image data on paper P, and output the same. The print function is to receive page data including image data and job data including image forming conditions of the image data and the like from an external device or the like, form an image based on the received page data and job data on paper P, and output the same.

As shown in FIGS. 1 and 2, the image forming apparatus 1 includes an image reading section 10, an image forming section 20, a fixation unit 22, a paper storage section 25, a conveyance section 30, an operation section 40, a controller 50, and the like.

The image reading section 10 includes: an automatic document-feeding unit 11 called an auto-document feeder (ADF); and a reading unit 12. The reading unit 12 reads an image of a document d placed on a contact glass 12*a*, where the document d is to be read, with a charge coupled device (CCD).

The document d placed on a document tray 11*a* of the automatic document-feeding unit 11 is fed onto the contact glass 12*a*, where the document d is to be read, and an image or images of one or both sides of the document d is/are read by the CCD.

Herein, the image includes not only image data of graphics, photographs, and the like but also text data of characters, symbols, and the like.

The image read by the image reading section 10 (analog image signals) is outputted to a CPU 51 later described (see FIG. 2) and is then subjected to various types of image processing, such as analog processing, A/D conversion, shading correction, and image compression. The obtained image data is separated by colors of yellow (Y), magenta (M), cyan (C), and black (K) to be outputted to the image forming section 20 as digital image data.

The image forming section 20 performs electrophotographic image forming process based on the inputted image data.

The image forming section 20 includes: exposure units 2Y, 2M, 2C, and 2K; development units 3Y, 3M, 3C, and 3K; photoreceptor drums 4Y, 4M, 4C, and 4K as image supporting members; charge units 5Y, 5M, 5C, and 5K; cleaning units 6Y, 6M, 6C, and 6K for the photoreceptor drums; primary transfer rollers 7Y, 7M, 7C, and 7K; an intermediate transfer belt 8; a cleaning unit 9 for the intermediate transfer belt 8; a secondary transfer roller 21, and the like.

In the image forming section 20, the portion where the intermediate transfer belt 8 and secondary transfer roller 21 are in pressure contact functions as an image transfer unit which transfers an image on paper P for image formation.

Each of the exposure units 2Y, 2M, 2C, and 2K includes a laser beam source such as a laser diode (LD), a polygon mirror, plural lenses, and the like.

The exposure units 2Y, 2M, 2C, and 2K scan and expose the surfaces of the photoreceptor drums 4Y, 4M, 4C, and 4K with laser beams based on the image data transmitted from the controller 50 (CPU 51), respectively. By the scanning exposure with the laser beams, latent images are formed, or images are written on the photoreceptor drums 4Y, 4M, 4C, and 4K which are charged by the charge units 5Y, 5M, 5C, and 5K, respectively.

The latent images formed on the photoreceptor drums 4Y, 4M, 4C, and 4K are developed with toner by the respective development units 3Y, 3M, 3C, and 3K to be visualized, so that toner images are formed on the respective photoreceptor drums 4Y, 4M, 4C, and 4K.

The toner images formed and supported on the photoreceptor drums 4Y, 4M, 4C, and 4K are primary-transferred onto the intermediate transfer belt 8 by the primary transfer rollers 7Y, 7M, 7C, and 7K, respectively.

Residual toner on the surfaces of the photoreceptor drums 4Y, 4M, 4C, and 4K which have already finished transfer of the toner images are removed by the respective cleaning units 6Y, 6M, 6C, and 6K.

The intermediate transfer belt 8 is an endless belt member (an endless belt) which is laid over plural rollers (for example, belt rollers 81 and 88) and is rotatably supported by the same. The intermediate transfer belt 8 rotates in a predetermined conveyance direction (clockwise in the drawing) with rotation of the rollers.

The intermediate transfer belt 8 is brought into pressure contact with the photoreceptor drums 4Y, 4M, 4C, and 4K by the primary transfer rollers 7Y, 7M, 7C, and 7K, respectively. The toner images developed on the surfaces of the photoreceptor drums 4Y, 4M, 4C, and 4K are therefore transferred (primary-transferred) to the intermediate transfer belt 8 at transfer positions of the primary transfer rollers 7Y, 7M, 7C, and 7K, respectively.

The intermediate transfer belt 8 comes into pressure contact with the paper P at a transfer position of the secondary transfer roller 21, and the toner image formed on the intermediate transfer belt 8 is thus transferred (secondary-transferred) to the paper P.

After the intermediate transfer belt 8 transfers the toner image to the paper P by the secondary transfer roller 21, the paper P is separated by the curvature and electrostatic nature to be fed to the fixation unit 22.

The intermediate transfer belt 8 which has finished the transfer of the toner image to the paper P is then subjected to removal of foreign substances, such as residual toner, by the cleaning unit 9.

Figure 3:
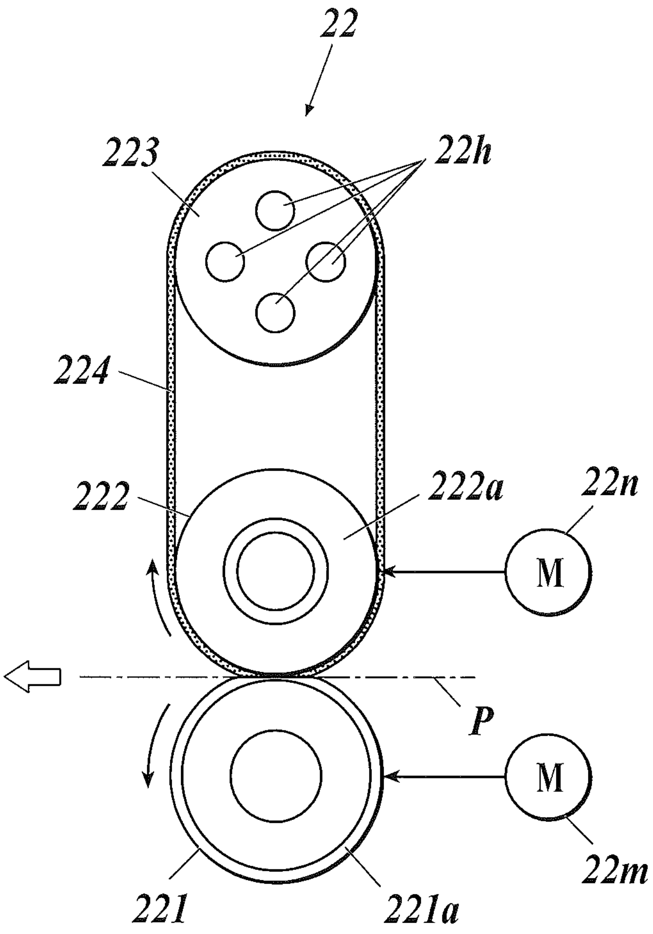
FIG. 3 is an enlarged side view showing a fixation unit of the image forming apparatus.

As shown in FIGS. 1 to 3, the fixation unit 22 includes: a first roller 221 and a second roller 222 as a pair of rollers between which the paper P with the toner image formed by secondary transfer is fed; a heating roller 223 for heating the second roller 222; an endless belt member 224 laid over the second roller 222 and heating roller 223; and the like. The heating roller 223 includes a heater **22*h* inside and heats the second roller 222 through the belt member 224**.

As shown in FIG. 2, the fixation unit 22 includes: a first roller driving section **22*m* for rotating the first roller 221; a second roller driving section 22*n* for rotating the second roller 222; an approach-and-separation driving section 22*o* for bringing the first and second rollers 221 and 222 close to or away from each other; and a load data detection section 22*p* for detecting roller drive load data concerning rotational drive of the first or second roller 221 or 222. As the roller drive load data, the load data detection section 22*p* detects driving power with which the first roller driving section 22*m* rotates the first roller 221**, for example.

The first and second rollers 221 and 222 are rotatably provided and extended in the direction crossing the direction that the paper P is conveyed by the conveyance section 30 and the direction that the paper P is fed.

Each of the first and second rollers 221 and 222 includes an elastic layer in the circumferential surface thereof. The elastic layer is composed of a material having high heat conduction, such as silicone rubber. By the first and second rollers 221 and 222 which are rotating with the circumferential surfaces being in close contact with each other, the paper P nipped between the paired first and second rollers 221 and 222 is sandwiched and conveyed.

As shown in FIG. 3 in particular, an elastic layer **221*a* of the first roller 221 is thicker than an elastic layer 222*a* of the second roller 222. For example, the elastic layer 221*a* of the first roller 221 has a thickness of 1 mm while the elastic layer 222*a* of the second roller 222** has a thickness of 20 mm.

In the outermost layers of the belt 224 and the second roller 222, which come into direct contact with paper or toner, 30 μm-thick releasing layers are provided to prevent contamination by toner or adherence of toner.

The first and second rollers 221 and 222 are brought close to or away from each other by the approach-and-separation driving unit **22*o*, thus switched between the state where the first and second rollers 221 and 222 are in pressure contact and the state where the first and second rollers 221 and 222** are spaced apart from each other.

When the first and second rollers 221 and 222 are brought into pressure contact with each other, the belt member 224 is sandwiched by the first and second rollers 221 and 222 to form a nip region between the outer circumferential surface of the first roller 221 and the outer circumferential surface of the belt member 224.

By feeding the paper P with the toner image formed thereon through the nip region, the toner image is fixed on the paper P. In other words, the paper P is fed between the first and second rollers 221 and 222 with the belt member 224 interposed therebetween. The paper P is fed with the surface where the toner image is formed facing the second roller 222 side (the belt member 224 side).

The first roller 221 is a driving roller rotated at a constant circumferential speed by the first roller driving section **22*m* (see FIG. 2**).

The second roller 222 is a driven roller. In a state where the first and second rollers 221 and 222 are in pressure contact, the second roller 222 rotates with rotation of the first roller 221 and stops rotating when the first roller 221 stops rotating. The second roller 222 is rotated by the second roller driving section **22*n* (see FIG. 2) with a constant torque low enough for the second roller 222 to stop rotating when the first roller 221** stops rotating.

The first roller driving section **22*m*** is a DC brushless motor, for example, and the speed of such a motor can be controlled by feedback of the output of an encoder incorporated in the motor.

The second roller driving section **22*n*** is a DC brushless motor, for example, but does not include a rotation speed detection mechanism. The motor is turned on and off by PWM control to limit the effective current value for torque control.

The fixation unit 22 nips and conveys the paper P between the first roller 221 and second roller 222 (belt member 224) for heat fixation of the toner image transferred to the paper P. In such a manner, the toner image is fixed on the paper P for image formation. The paper P having finished the fixing process by the fixation unit 22 is discharged to an output tray 91.

The image formation by the image forming section 20 refers to a series of operations of forming latent images on the respective photoreceptor drums 4Y, 4M, 4C, and 4K by the exposure units 2Y, 2M, 2C, and 2K, causing toner to adhere to the formed latent images for development, primary transferring the developed toner image onto the intermediate transfer belt 8, and further secondary transferring the image onto the paper P. Moreover, a series of operations including fixing the toner image secondary transferred to the paper P by the fixation unit 22 is included in image formation by the image forming apparatus 1.

The paper storage section 25 includes plural paper feed trays 25*a*, 25*b*, and 25*c* and paper feeders 25*d*.

The paper feed trays 25*a*, 25*b*, and 25*c* store various types of paper P identified by the weight, size, and the like by previously set types.

The paper feeders 25*d* are configured to feed paper P accommodated in each paper feed tray from the top one by one toward the conveyance section 30.

The conveyance section 30 includes: a conveying path R from the paper storage section 25 toward the image transfer section (the intermediate transfer belt 8 and secondary transfer roller 21); and plural conveyance roller pairs (31, 32, and 33) which are located on the conveying path R and convey the paper P fed from the paper storage section 25 to the image transfer section. The conveying path R partially extends to the route from the image transfer section toward the output tray 91 and the route for turning over the paper.

The conveyance section 30, in particular, includes a resist roller pair 32, a loop roller pair 31, and paper feeding roller pairs 33. The resist roller pair 32 is provided immediately near the image transfer section (the intermediate transfer belt 8 and secondary transfer roller 21) on the upstream side thereof on the conveying path R. The loop roller pair 31 is provided adjacent to the resist roller pair 32 on the upstream side thereof. The paper feeding roller pairs 33 are provided between the loop roller pair 31 and paper feed trays (paper feeders 25*d*).

The loop roller pair 31 includes a function to correct the skew (skew feeding) of the paper P. Specifically, the paper P having passed through the loop roller pair 31 hits the resist roller pair 32 which is stopped. The paper P having hit the resist roller 32 is further conveyed by the loop roller pair 31 to be bent, so that the skew feeding of the paper P is corrected along the nip line of the resist roller pair 32.

The resist roller pair 32 includes a function to adjust the position of the paper P relative to the toner image primary-transferred to the intermediate transfer belt 8 by sandwiching the paper P which is being conveyed for image formation as swinging in a direction orthogonal to the direction that the paper is conveyed.

The operation section 40 includes a liquid crystal display panel and a touch panel provided on a display screen of the liquid crystal display panel, for example. By touch operations of various operation keys displayed on the liquid crystal display panel and the like, the touch panel detects the position touched, and the operation section 40 outputs an operation signal corresponding to the detected position to the controller 50 (CPU 51).

As shown in FIG. 2, the image forming apparatus 1 includes the controller 50 integrally controlling each section of the apparatus. The controller 50 is connected to the image reading section 10, image forming section 20, fixation unit 22, conveyance section 30, operation section 40, and the like.

The controller 50 includes a central processing unit (CPU) 51, a random access memory (RAM) 52, and a read only memory (ROM) 53.

The CPU 51 loads a specified program out of a system program and various application programs stored in the ROM 53 into the RAM 52 and executes various processes in cooperation with the programs loaded in the RAM 52 for central control of the sections of the image forming apparatus 1.

The RAM 52 is a volatile memory, for example. The RAM 52 includes a work area storing various programs executed by the CPU 51, data concerning the various programs, and the like and temporarily stores such information.

The ROM 53 stores, for example, the system program executable by the image forming apparatus 1 (CPU 51), the various processing programs executed by the system program, data used to execute those various processing programs, and the like.

For example, the ROM 53 stores a drive control program to rotate the first and second rollers 221 and 222 on different driving conditions, a torque correction control program to correct the value of torque for rotationally driving the second roller 222 for rotational drive of the first and second rollers 221 and 222, and the like.

The ROM 53 stores the toner melting data, the roller drive load data, and the like as the predetermined storage unit. The toner melting data is data including at least one of temperature setting and circumferential speed of the second roller 222. The roller drive load data is data concerning the accumulated driving time of the fixation unit 22.

The drive control program stored in the ROM 53 is a program for driving and controlling the first and second roller drive sections 22*m* and 22*n* to rotate the first and second rollers 221 and 222 on different driving conditions from each other so that the first roller 221 rotates at a constant circumferential speed and that the second roller 222 rotates with a constant torque.

To be specific, the drive control program causes the controller 50 to implement the control for driving the first and second roller driving sections 22*m* and 22*n* so that: at least in a state where the first and second rollers 221 and 222 are in pressure contact with each other, the first roller 221 rotates at a constant circumferential speed while the second roller 222 rotates with a constant torque low enough for the second roller 222 to stop rotating when the first roller 221 stops rotating.

When the CPU 51 executes the drive control program, the controller 50 functions as a drive controller which drives the first and second roller driving sections 22*m* and 22*n* so as to rotate the first roller 221 at a constant circumferential speed and rotate the second roller 222 at a constant torque low enough for the second roller 222 to stop rotating when the first roller 221 stops rotating.

The torque correction control program stored in the ROM 53 is a program for causing the controller 50 to implement a control to correct the value of torque for rotationally driving the second roller 222 concerning the rotational drive of the first and second rollers 221 and 222.

When the CPU 51 executes the torque correction control program, the controller 50 functions as a torque correction controller which corrects the value of torque for rotationally driving the second roller 222 based on at least one of the toner melting data and roller drive load data which are stored in a predetermined storage unit (ROM 53) in advance.

Moreover, when the CPU 51 executes the torque correction control program, the controller 50 functions as a torque correction controller which corrects the value of torque for rotationally driving the second roller 222 based on the driving power for rotating the first roller 221 as the roller drive load data detected by the load data detection section 22*p*.

The controller 50 functioning as the drive controller drives the second roller drive section 22*n* so as to rotate the second roller 222 with the torque corrected by the controller 50 as the torque correction controller.

Next, a description is given of rotation driving forces of the first and second rollers 221 and 222 of the fixation unit 22.

Figure 4A:
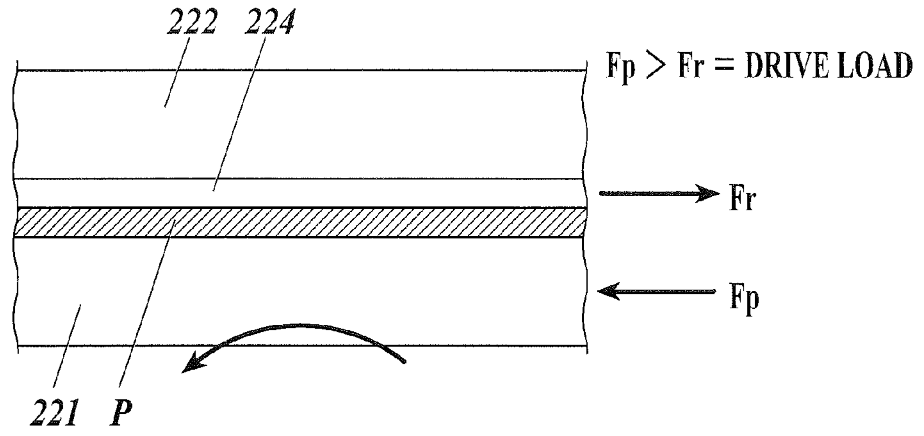
FIG. 4A is an explanatory view concerning rotational driving force of first and second rollers of the fixation unit, showing a case where paper including no toner image is fed to the fixation unit.

As shown in FIG. 4A, in the case where the paper P not including any toner image formed thereon is fed through the nip region between the outer circumferential surface of the first roller 221 and the outer circumferential surface of the belt member 224, the coefficient of friction between the belt member 224 and the paper P is large enough, and the paper P does not slip on the belt member 224. Accordingly, the rotational force of the first roller 221 which is rotating with a driving force Fp is transmitted to the belt member 224, and the belt member 224 is subjected to resistance force Fr corresponding to the driving force Fp.

Figure 4B:
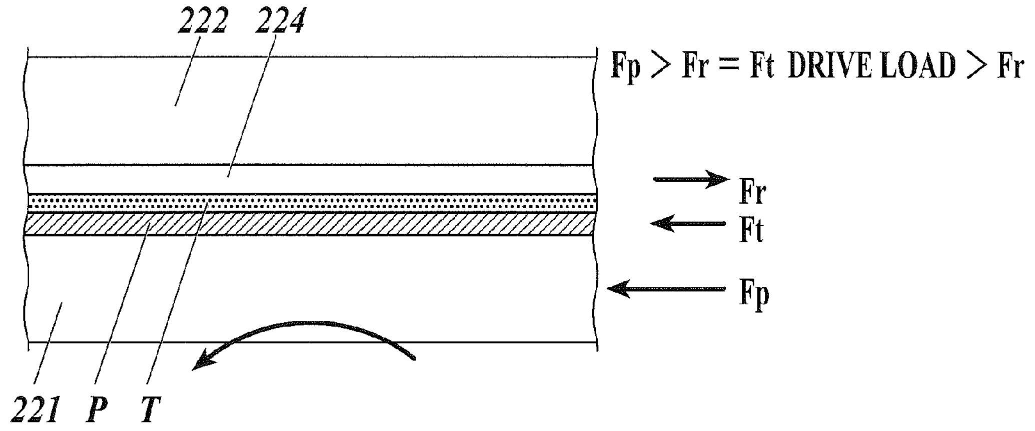
FIG. 4B is an explanatory view concerning the rotational driving force of the first and second rollers of the fixation unit, showing a case where slippage occurs due to a toner layer on paper.

On the other hand, as shown in FIG. 4B, when the paper P having the toner layer T which is composed of toner adhering to the entire surface thereof is fed through the nip region, slip of paper due to the molten toner layer T occurs. Accordingly, not all of the rotational force of the first roller 221 which is rotating with the driving force Fp is transmitted to the belt member 224. For example, the resistance force Fr corresponding to Ft is transmitted to the belt member 224. Herein, Ft is a maximum force that can be transmitted from the first roller 221 to the belt member 224 on the second roller 222 side through the paper P and toner layer T.

In such a manner, the resistance force Fr applied to the belt member 224 through the paper P is different between when the toner layer T is on the paper P (see FIG. 4B) and when the toner layer T is not on the paper P (see FIG. 4A).

If some portions of paper P fed through the nip region include toner images (toner layer T) and other portions include no toner image, the resistance force Fr applied to the belt member 224 is different between in the portions including the toner layers T and in the portions including no toner layers T. Accordingly, different portions of the paper P slip different amounts, thus causing paper winkling.

Figure 4C:
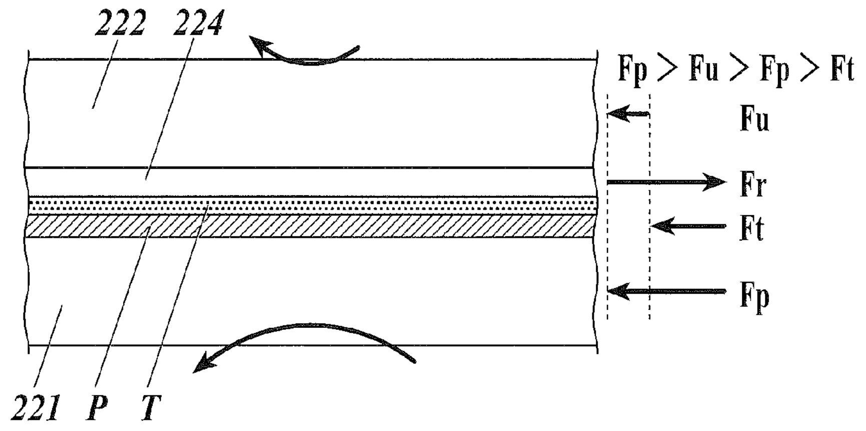
FIG. 4C is an explanatory view concerning the rotational driving force of the first and second rollers of the fixation unit, showing a case where auxiliary drive by the second roller is performed.

Accordingly, as shown in FIG. 4C, the second roller 222 is configured to rotate with a constant torque producing an auxiliary driving force Fu which satisfies the relation of Fp>Fu>Fp-Ft. Herein, Ft is the maximum force that can be transmitted from the first roller 221 to the second roller 222 side through the paper P and toner layer T when the paper P having the toner layer T, which is composed of toner adhering to the entire surface, is fed between first roller 221 which is rotating with the driving force Fp and the second roller 222 and belt member 224 which are driven to rotate according to the rotation of the first roller 221. By rotating the second roller 222 with a torque corresponding to the auxiliary driving force Fu, the belt member 224 receives the resistance force Fr corresponding to the rotational force of the first roller 221 which is rotating with the driving force Fp.

The second roller 222 is rotated by the controller 50, which functions as the drive controller, with a constant torque which adds the auxiliary driving force Fu, which satisfies the relation of Fp>Fu>Fp-Ft. The second roller 222 which is rotated by the auxiliary driving force Fu satisfying the above condition is a roller driven by the first roller 221. Accordingly, the second roller 222 rotates following the first roller 221 which is rotating by the driving force Fp when the paper P does not slip and adds the auxiliary driving force Fu due to the rotation thereof when the paper P slips.

In such a manner, the lack of the force (Ft) that can be transmitted from the first roller 221 rotating by the driving force Fp to the belt member 224 is compensated by the auxiliary driving force Fu of the second roller 222. This can prevent slip of the paper P irrespective of the presence or absence of the toner image (toner layer T) on the paper P, thus allowing the paper P to be sandwiched and conveyed without causing paper wrinkling.

Herein, when the driving roller has a thick elastic layer, the durability of the elastic layer degrades quickly because of large strain of the elastic material (silicone rubber) due to the shear stress at the interface between the core and the elastic layer. Accordingly, in the light of the durability, it is not desirable that the driving roller is composed of a roller with a thick elastic layer. It is therefore preferable that the first roller 221 at the lower side serves as the driving roller like the fixation unit 22 of the present invention shown in FIG. 3.

However, in a fixation unit which has an elastic layer having a large rubber thickness and high fixing load in order to provide a large nip width compared with the roller diameter, driving load is large. Accordingly, in the case where the blank paper P having no toner is fed through the fixation unit, enough driving force can be transmitted from the first roller 221. However, when the paper P with molten toner on the paper P is fed through the fixation unit, the driving force is not transmitted enough, thus causing a state where paper slip is likely to occur. In an image including both regions having toner and regions not having toner, the driving force that can be transmitted varies on locations, and the paper P receives different stresses at the corresponding locations, thus causing paper wrinkling.

Accordingly, regardless of the image, the auxiliary torque value is set to the torque (Fu), which satisfies Fu>Fp-Ft and compensates the lack of torque in the presence of toner. Moreover, in order not to invert the driving and driven relation, Fu is configured to satisfy Fp>Fu.

Concerning the rotational drive of the first and second rollers 221 and 222, the controller 50 functioning as the drive controller rotates the first and second rollers 221 and 222 on the drive conditions satisfying the relation of: (Driving power for rotating the first roller 221)>(Driving power for rotating the second roller 222)>(Driving power for rotating the first roller 221−lower limit of driving power of the first roller 221 at which paper wrinkling occurs). The driving power is described later.

Next, the auxiliary driving force Fu with which the controller 50 as the drive controller rotates the second roller 222 is described in terms of the rotational drive of the first and second rollers 221 and 222 in the fixation unit 22.

For it is difficult to measure the frictional force in the nip region of the fixation unit 22, actually, the torque value corresponding to the auxiliary driving force Fu of the second roller 222 is set based on the relation between the driving torque of the first roller 221 and the nip width and the relation between the driving power of the first roller 221 and the nip width.

Accordingly, the correlation between the driving torque of the first roller 221 and the nip width and the correlation between the driving power of the first roller 221 and the nip width are calculated in advance.

Figure 5:
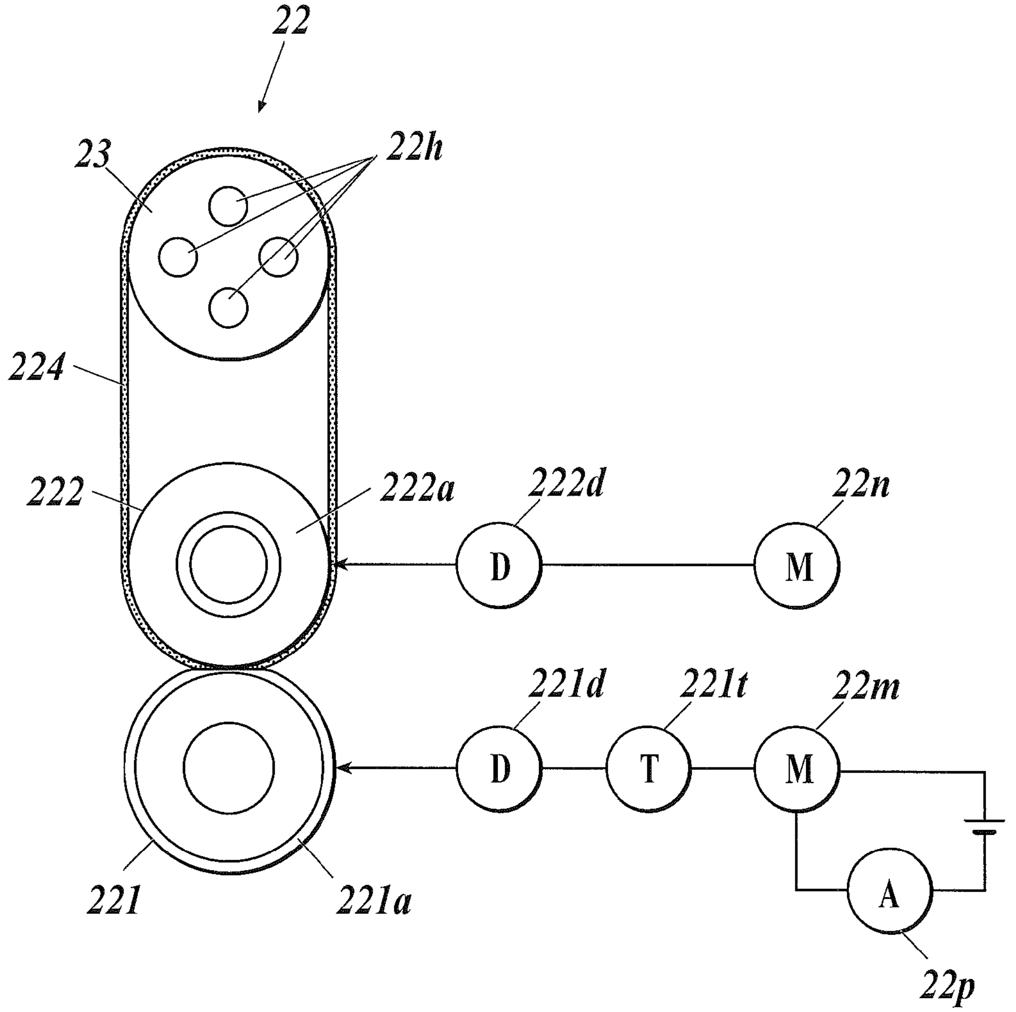
FIG. 5 is an explanatory view concerning the fixation unit of the image forming apparatus.

For example, as shown in FIG. 5, a reduction gear train 221*d* and a dynamic torque meter 221*t* are provided between the first roller 221 and the first roller driving section 22*m*. A reduction gear train 222*d* is provided between the second roller 222 and the second roller driving section 22*n*. The relation between the driving torque of the first roller 221 and the nip width is obtained as follows. The first and second rollers 221 and 222 are brought into close contact with each other by increasing the spring load with the second roller 222 not rotationally driven. The values of current flowing to the first roller driving section 22*m* are measured by varying the nip width and the torque of the first roller 221.

At this time, since the torque depends on the number of revolutions, the calculation is made for the relation between the current value and torque at the number of revolutions of the roller pair which is used in actual operation of the fixation unit 22. The torque is then calculated based on the measured current values. If it is difficult to install the dynamic torque meter 221*t* for an actual apparatus, the torque can be obtained by conversion based on the relation between the current values and torque.

Figure 6A:
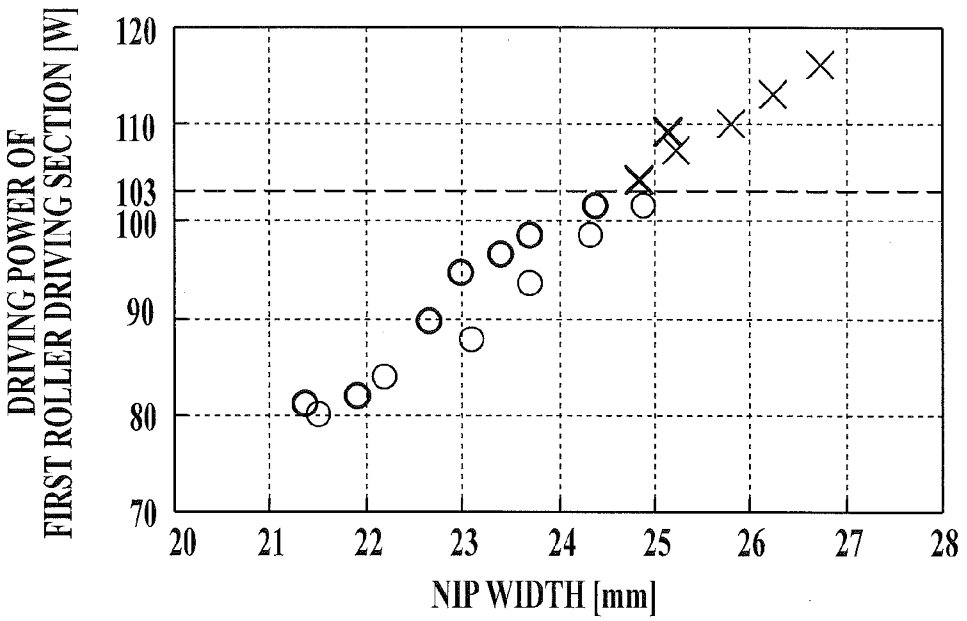
FIG. 6A is an explanatory view showing a correlation between driving power of a first roller driving section and the nip width in the fixation unit.
Figure 6B:
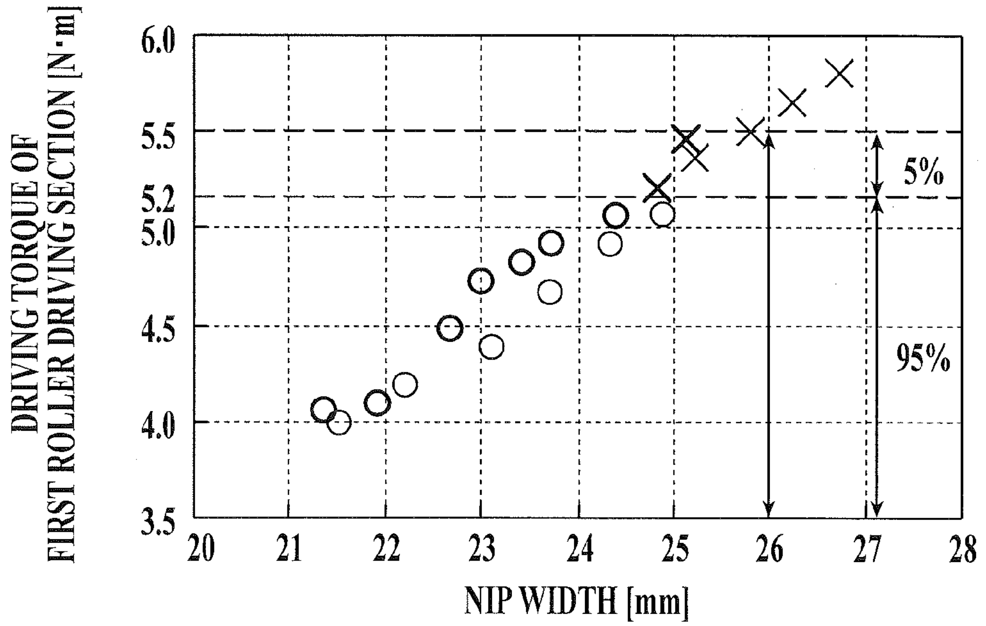
FIG. 6B is an explanatory view showing a correlation between driving torque of the first roller driving section and the nip width in the fixation unit.

The thus-calculated relation between the driving power of the first roller driving section 22*m* and the nip width is shown in FIG. 6A, and the relation between the driving torque of the first roller driving section 22*m* and the nip width is shown in FIG. 6B. As shown in FIGS. 6A and 6B, the driving power and torque of the first roller driving section 22*m* increase substantially in proportion to the increase in nip width. The driving torque that can be transmitted from the first roller 221 to the second roller 222 (belt member 224) through the toner layer is 5.2 N·m (see FIG. 6B). The driving power of the first roller driving section 22*m* corresponding to the driving torque of 5.2 N·m is 103 W (see FIG. 6A).

The calculated correlation data of the driving power of the first roller 221 and the nip width (FIG. 6A) and the correlation data of the driving torque of the first roller 221 and the nip width (FIG. 6B) are stored in a storage unit such as the ROM 53.

If the driving torque exceeds 5.2 N·m, which is the maximum driving torque that can be transmitted from the first roller 221 to the second roller 222 (belt member 224) through the toner layer T, paper wrinkling occurs. Accordingly, the auxiliary torque of the second roller 222 is set so that the driving torque of the first roller 221 is under the lower limit of the torque that causes paper wrinkling.

For example, when the nip width of the nip region is 26 mm, as shown in FIG. 6B, as the driving load of the first roller 221, a driving torque of 5.5 N·m is required, but it is expected that only a driving force of 5.2 N·m can be transmitted at the maximum. In other words, the driving torque of the first roller 221 has a shortage of 0.3 N·m. Accordingly, it is necessary to compensate by the second roller 222, the torque by not less than 0.3 N·m and not more than 5.5 N·m, which is the total driving torque.

In this case, the auxiliary driving force Fu needs to be not less than 0.3 N·m and less than 5.5 N·m. In the light of the durability, it is desirable that the driving force of the second roller 222 be as small as possible. Accordingly, the auxiliary torque value is set to 0.5 N·m. However, this value is a torque at the motor output shaft as a main driving source, and actually, it is necessary to perform conversion due to the gear reduction ratios of the gear trains and the ratios in radius of the rollers. In this configuration, the roller diameters of the roller pair (first and second rollers 221 and 222) are both ϕ80, and the gear reduction ratios are both 1/30. Accordingly, the auxiliary torque value is set to 0.5 N·m.

In the case where the nip width of the nip region is set to 26 mm, the control is executed to rotate the first roller 221 with a torque of 5.2 N·m at a constant circumferential speed and rotate the second roller 222 with a constant torque of 0.5 N·m.

Herein, if the transmission of the driving force in the nip region is expressed in torque, the torque values are affected by the roller diameters and reduction ratios of the driving systems and are therefore difficult to generally use. Use of power (=current applied to the motor×voltage) is not affected by the mechanical configuration, which is simple.

For example, in the case where the nip width of the nip region is set to 26 mm, as shown in FIG. 6A, to drive the first roller 221 requires a driving power of 110 W at the first roller driving section 22*m*, but such drive requiring a driving power of 103 W or more is considered to cause paper wrinkling. Accordingly, it is necessary to compensate the power so that the first roller driving section 22*m* is supplied with a driving power of 103 W and the second roller driving section 22*n*, which drives the second roller 222, is supplied with a driving power of not less than 7 W and not more than 110 W. Actually, it is desirable that the auxiliary driving power be as small as possible in the light of the durability, and the auxiliary driving power is therefore set to 10 W.

In the case where the nip width of the nip region is set to 26 mm, control to rotate the first roller 221 at a power of 103 W at a constant circumferential speed and to rotate the second roller 222 by a power of 10 W with a constant torque is executed.

As described above, the image forming apparatus 1 includes the fixation unit 22 including: the first roller 221 rotated at a constant circumferential speed; and the second roller 222 which is rotated with a constant torque low enough to stop rotating when the first roller 221 stops rotating.

In the fixation unit 22, based on the correlation data of the driving power of the first roller 221 and the nip width and the correlation data of the driving torque of the first roller 221 and the nip width as shown in FIGS. 6A and 6B, the first roller 221 is rotated with the driving force Fp, and the second roller 222 is rotated with such a constant torque that can add the auxiliary driving force Fu satisfying the aforementioned relation of Fp>Fu>Fp-Ft, where Ft is the maximum force that can be transmitted from the first roller 221 to the second roller 222 through the paper P and the toner layer T. This can compensate the lack of the force (Ft) which can be transmitted from the first roller 221 rotating with the driving force Fp to the belt member 224 with the auxiliary driving force Fu of the second roller 222.

The fixation unit 22 can therefore prevent slip of the paper P regardless of the presence or absence of a toner image (toner layer T) on the paper P and can sandwich and convey the paper P without causing paper wrinkling. The toner image can be therefore preferably fixed on the paper P.

As described above, the fixation unit 22 according to the present invention can sandwich and convey the paper P so that the paper P does not slip regardless of the toner image fixed on the paper P, thus implementing the fixing process which is less likely to cause paper wrinkling on the paper P.

That is to say, the image forming apparatus 1 including the fixation unit 22 can perform good printing and image formation without causing paper wrinkling on the paper P at forming any kinds of images including, images of only characters, images of both characters and photographs, images with small margins, images with large margins, and the like.

In the case of setting the nip width of the nip region to 26 mm, for example, with reference to the correlation data of the driving torque of the first roller 221 and the nip width as shown in FIG. 6B, the fixation unit 22 is not limited to executing the control to rotate the first roller 221 at a constant circumferential speed with a torque of 5.2 N·m and rotate the second roller 222 with a constant torque of 0.5 N·m.

For example, the fixation unit 22 may correct the value of torque for rotationally driving the second roller 222 based on a correction value corresponding to the temperature setting and the circumferential speed of the second roller 222 as the toner melting data, which is stored in the storage unit (ROM 53) in advance, and execute the control to rotate the second roller 222 with the corrected torque.

Figures 7, 8:
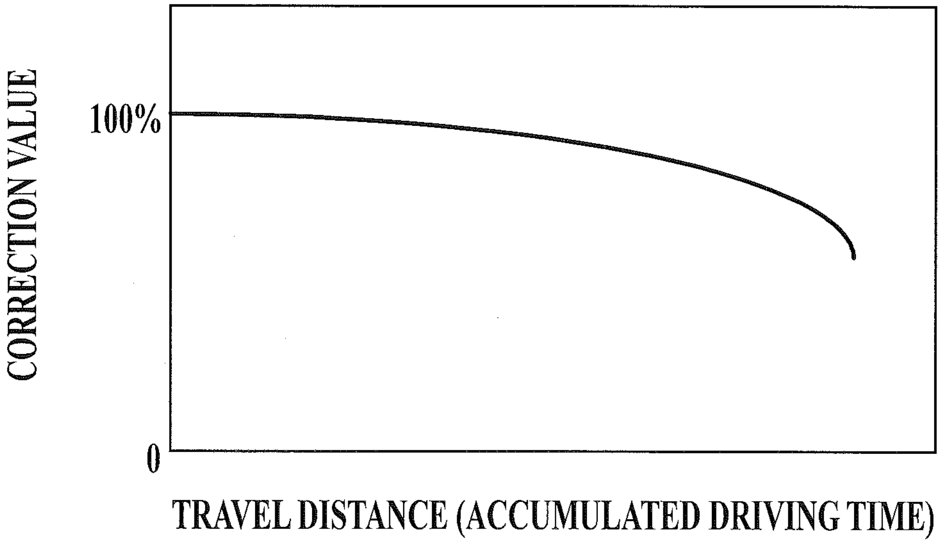
FIG. 7 is a table showing examples of correction values concerning controlled temperature and circumferential speed of the second roller as toner melting data.
FIG. 8 shows connection curve data representing examples of correction values concerning accumulated driving time of the fixation unit as roller drive load data.

The temperature setting and circumferential speed of the second roller 222, as the toner melting data, are stored in the ROM 53 in the form of a table as shown in FIG. 7, for example. In the case of the table shown in FIG. 7, the condition with a temperature setting of 200° C. and a circumferential speed of 450 m/s is set as the referential condition. The table 7 shows correction factors of various conditions (temperature setting×circumferential speed) where the correction factor at the referential condition is 100% (zero correction).

On fixing conditions where the temperature setting and circumferential speed (nip time) of the second roller 222 are different, the toner layers T melt differently, and the degrees of slip of paper P are different. Accordingly, the way of correcting the value of torque for rotationally driving the second roller 222 based on the temperature setting and circumferential speed and rotating the second roller 222 with the corrected torque is an effective means on implementing the fixing process which cannot cause paper wrinkling on the paper P.

If the correlation data shown in FIGS. 6A and 6B are obtained at the conditions with a temperature setting of 200° C. and a circumferential speed of 450 m/S as the referential condition, similar measurements are performed at the other conditions (temperature setting times circumferential speed) to set the correction factors for the other conditions.

Moreover, for example, the fixation unit 22 may correct the value of torque for rotationally driving the second roller 222 based on a correction value corresponding to the accumulated driving time of the fixation unit 22 as the roller drive load data, which is stored in a predetermined storage unit (ROM 53) in advance, and execute the control to rotate the second roller 222 with the corrected torque.

The accumulated driving time of the fixation unit 22 as the roller drive load data is stored in the ROM 53 as correction curve data as shown in FIG. 8, for example. The accumulated driving time of the fixation unit 22 corresponds to the moving distance (accumulated distance) that paper P passes through between first and second rollers 221 and 222.

As the accumulated driving time of the fixation unit 22 increases, the elastic layers of the rollers degrade and change in flexibility and hardness, thus changing the degree of slip the paper P. Accordingly, the way of correcting the value of torque for rotationally driving the second roller 222 based on the accumulated driving time and rotationally driving the second roller 222 with the corrected torque is an effective means on implementing the fixing process which cannot cause paper wrinkling on the paper P.

Moreover, for example, the fixation unit 22 may correct the value of torque for rotationally driving the second roller 222 based on the driving power for rotating the first roller 221 as the roller drive load data, which is detected by the load data detection section 22*p*, and then execute the control to rotate the second roller 222 with the corrected torque.

If the load data detection section 22*p* detects the driving power for rotating the first roller 221, the torque of the first roller 221 which is actually rotating can be detected. Accordingly, the value of torque for rotationally driving the second roller 222 can be corrected according to the fixation unit 22 which is in operation. The way of rotating the second roller 222 with the corrected torque is therefore an effective means on implementing the fixing process which cannot cause paper wrinkling on the paper P.

For example, the detection of the roller drive load data (driving power) is performed by measuring the value of current flowing through the first roller driving section 22*m* for rotating the first roller 21 in a state where the auxiliary driving of the second roller 222 is off and the first and second rollers 221 and 222 are in pressure contact with each other. The detected value of current (driving power) is converted to the value of torque. It is desirable that the roller drive load data is detected before printing operation after warming up in the light of the influence of thermal expansion of the second roller 222.

The fixation unit 22 is not limited to correcting the value of torque for rotationally driving the second roller 222 based on various correction values and the like for executing the control to rotate the second roller 222 with the corrected torque. The fixation unit 22 may correct the value of torque of the second roller 222 also by correcting the value of driving power supplied to the second roller driving section 22*n*, which rotates the second roller 222, based on the various correction values.

Embodiment 2

Next, a description is given of Embodiment 2 of the fixation unit and the image forming apparatus according to the present invention. Same portions as those of Embodiment 1 are given the same reference numerals, and only different portions are described.

The ROM 53 of the controller 50 of the image forming apparatus 1 stores a torque distribution adjustment program for adjusting proportions of torque distributed to the first and second rollers 221 and 222 concerning rotational drive of the first and second rollers 221 and 222.

The torque distribution adjustment program stored in the ROM 53 is a program for causing the controller 50 to implement the control to adjust the proportions of torque distributed to the first and second rollers 221 and 222 concerning rotational drive of the first and second rollers 221 and 222.

When the CPU 51 executes the torque distribution adjustment program, the controller 50 functions as a torque distribution adjustment controller as follows. The controller 50 adjusts the torque proportion distributed to the second roller to a proportion which is obtained as the lowest proportion that cannot cause paper wrinkling when the torque proportion of the second roller 222 is increased starting from 0% as a torque proportion of the second roller 222 in the case of rotationally driving only the first roller 221.

The controller 50 functioning as the drive controller drives the first and second roller driving sections 22*m* and 22*n* so that the first and second rollers 221 and 222 are rotated according to the torque proportions adjusted by the controller 50 as the torque distribution adjustment controller.

For example, the relation between the nip width and the driving torque of the first roller 221 is obtained in the following manner: the nip width and the load torque are varied by increasing spring load with the second roller 222 being not driven; and the values of current flowing to the first roller driving section 22*m*, which rotates the first roller 221, are measured for the various values of the nip width. In proportion to the increase in driving load due to an increase in nip width, the driving torque of the first roller 221 increases. When the driving torque exceeds the driving torque that can be transmitted through the toner layer, paper wrinkling occurs. For the load torque necessary at the predetermined nip width, the proportion of torque of the second roller 222 is increased starting from 0%, which is set as the proportion of torque of the second controller 222 not performing auxiliary drive, and the lowest proportion that does not cause paper wrinkling is set as the setting of the proportion of torque.

Herein, when the nip width of the nip region is 26 mm, as shown in FIG. 6B, a driving torque of 5.5 N·m is necessary as the driving load of the first roller 221, and the fixing process therefore requires a load torque of 5.5 N·m. When the proportion of torque distributed to the second roller 222 at this time is set to 0% and is increased, it is found in FIG. 6B that the lowest proportion of torque of the second roller 222 that does not cause paper wrinkling is 5%. Accordingly, the proportion of torque of the first roller 221 is 95%, and the proportion of torque of the second roller 222 is 5%. By the controller 50 functioning as the drive controller, the first roller 221 is rotated at a constant circumferential speed with a torque of 5.2 N·m (95% of 5.5 N·m), and the second roller 222 is rotated with a torque of 0.3 N·m (5% of 5.5 N·m).

Even the fixation unit 22 rotating the first and second rollers 221 and 222 with the proportions of torque adjusted by the controller 50 as the torque distribution adjustment controller can sandwich and convey the paper P without slip of the paper P regardless of the toner image to be fixed on the paper P and perform the fixing process which is less likely to cause paper wrinkling on the paper P.

That is to say, the image forming apparatus 1 including the thus-configured fixation unit 22 can perform good printing and image formation without causing paper wrinkling on the paper P at forming any kinds of images, including: images of only characters, images of both characters and photographs, images with small margins, images with large margins, and the like.

In the case of setting the nip width of the nip region to 26 mm, for example, with reference to the correlation data of the driving power of the first roller 221 and the nip width as shown in FIG. 6B, the fixation unit 22 is not limited to executing the control to rotate the first roller 221 at constant circumferential speed with a torque of 5.2 N·m (95%) and rotate the second roller 222 with a constant torque of 0.3 N·m (5%).

Similar to Embodiment 1 above, for example, the fixation unit 22 may correct the value of torque for rotationally driving the second roller 222 and execute the control to rotate the second roller 222 with the corrected torque. Herein, the corrected torque is obtained by correcting the torque distribution ratio based on the correction value (see FIG. 7) corresponding to the temperature setting and the circumferential speed of the second roller 222 as the toner melting data, which is stored in the storage unit (ROM 53) in advance, and the correction value (see FIG. 8) corresponding to the accumulated driving time of the fixation unit 22 as the roller drive load data, which is stored in a predetermined storage unit (ROM 53) in advance.

Moreover, similar to Embodiment 1 above, the fixation unit 22 may correct the value of torque for rotationally driving the second roller 222 in another way and execute the control to rotate the second roller 222 with the corrected torque. Herein, the corrected value of torque is obtained by correcting the torque distribution ratio based on the driving power for rotating the first roller 221 as the roller drive load data, which is detected by the load data detection section 22*p*.

Embodiment 3

Next, a description is given of Embodiment 3 of the fixation unit and the image forming apparatus according to the present invention. Same portions as those of Embodiment 1 are given the same reference numerals, and only different portions are described.

The first and second rollers 221 and 222 of the fixation unit 22 of the image forming apparatus 1 are configured to switch between a state where the first and second rollers 221 and 222 are in pressure contact with each other and a state where the first and second rollers 221 and 222 are spaced apart from each other.

The controller 50 functioning as the drive controller executes the control to rotate the second roller 222 using different values of torque for rotationally driving the second roller 222 in the two states including: the state where the first and second rollers 221 and 222 are in pressure contact with each other and in the state where the first and second rollers 221 and 222 are spaced apart from each other (two-phase switch control).

Moreover, the controller 50 functioning as the drive controller executes the control to rotate the second roller 222 using different values of torque for rotationally driving the second roller 222 in the three states including: the state where the first and second rollers 221 and 222 are in pressure contact with each other; the state where the first and second rollers 221 and 222 are spaced apart from each other; and the first and second rollers 221 and 222 are approaching or separating from each other (three-phase switch control).

The value of torque for rotationally driving the second roller 222 in the state where the first and second rollers 221 and 222 are in pressure contact with each other, in particular, is set larger than the value of torque for rotationally driving the second roller 222 in the state where the first and second rollers 221 and 222 are spaced apart from each other.

For example, as shown in FIG. 9, at the two-phase switching control, in the state where the first and second rollers 221 and 222 are in pressure contact with each other (at the pressure contact time), the second roller 222 is driven to rotate with a torque of 0.5 N·m. In the state where the first and second rollers 221 and 222 are spaced apart from each other (at the separation time) and in the state where the first and second rollers 221 and 222 are approaching and separating from each other (at the approaching and separating operation time), the second roller 222 is driven to rotate with a torque of 0.1 N·m.

At the three-phase switching control, in the state where the first and second rollers 221 and 222 are in pressure contact with each other (at the pressure contact time), the second roller 222 is driven to rotate with a torque of 0.5 N·m. In the state where the first and second rollers 221 and 222 are approaching and separating from each other (at the approaching and separating operation time), the second roller 222 is driven to rotate with a torque of 0.1 N·m. In the state where the first and second rollers 221 and 222 are spaced apart from each other (at the separation time), the second roller 222 is driven to rotate with a torque of 0.05 N·m.

By rotating the second roller 222 with a torque of 0.1 in the state where the first and second rollers 221 and 222 are approaching and separating from each other (at the approaching and separating operation time), the second roller 222 is driven to rotate at substantially the same circumferential speed as that of the first roller 221.

In such a manner, if there is no difference or a very small difference in circumferential speed between the first and second rollers 221 and 222 when the first and second rollers 221 and 222 come into pressure contact and separate from each other, the surfaces of the first and second rollers 221 and 222 and the belt member 224 cannot be damaged by friction.

Moreover, with regard to the drive of the second roller 222, since the driving load is small at the separation time, if the second roller 222 is driven with a same torque as that at the pressure contact time, the second roller 222 and belt member 224 rotate at a circumferential speed significantly higher than the circumferential speed during printing (at the pressure contact time), which is not preferable in the light of the friction at the approaching and separating operation time and the durability. Accordingly, the controller 50 performs a control to rotate the first and second rollers 221 and 222 with such a torque that allows the first and second rollers 221 and 222 to rotate at the substantially same circumferential speed at least in the state the first and second rollers 221 and 222 are approaching or separating from each other. Moreover, if the durability is priority in the state where the first and second rollers 221 and 222 are completely spaced apart from each other, the three-phase switching control is executed so that the second roller 222 rotates at a lower circumferential speed.

It is preferable that the values of torque be changed after the approaching operation is completed and before the separating operation starts in order to minimize the influence of friction.

If the durability of the second roller 222 is priority in the three-phase switching control, the second roller 222 is rotated with a smaller torque than the torque which allows the second roller 222 to rotate at the circumferential speed equal to that of the first roller 221 in the state where the first and second rollers 221 and 222 are completely spaced apart from each other. However, for the purpose of accelerating thermal expansion of the second roller 222 during idling, the second roller 222 may be configured to rotate at higher speed.

The control by the drive controller (controller 50) concerning the control to rotate the second roller 222 in Embodiment 3 is not limited to the method by the aforementioned torque control.

For example, the controller 50 functioning as the drive controller executes the control to rotate the second roller 222 at substantially the same circumferential speed as that of the first roller in the state where the first and second rollers 221 and 222 are approaching or separating from each other by changing the value of torque for rotationally driving the second roller 222.

Moreover, the controller 50 functioning as the drive controller executes the control to rotate the second roller 222 at substantially the same circumferential speed as that of the first roller 221 in the state where the first and second rollers 221 and 222 are approaching or separating from each other and in the state where the first and second rollers 221 and 222 are spaced apart from each other by changing the value of torque for rotationally driving the second roller 222.

For example, as shown in FIG. 10, at the two-phase switching control where the first roller 221 rotates at a constant circumferential speed of 450 mm/s, the second roller 222 is driven to rotate with a torque of 0.5 N·m in the state where the first and second rollers 221 and 222 are in pressure contact with each other (at the pressure contact time). In the state where the first and second rollers 221 and 222 are spaced apart from each other (at the separation time) and the state where the first and second rollers 221 and 222 are approaching or separating from each other (at the approaching and separating operation time), the second roller 222 is rotationally driven with such a torque for a circumferential speed of 450 mm/s.

At the three-phase switching control where the first roller 221 rotates at a constant circumferential speed of 450 mm/s, the second roller 222 is driven to rotate with a torque of 0.5 N·m in the state where the first and second rollers 221 and 222 are in pressure contact with each other (at the pressure contact time). In the state where the first and second rollers 221 and 222 are approaching or separating from each other (at the approaching and separating operation time), the second roller 222 is rotationally driven with a torque for a circumferential speed of 450 mm/s. In the state where the first and second rollers 221 and 222 are spaced apart from each other (at the separation state), the second roller 222 is rotationally driven with a torque for a circumferential speed of 400 mm/s.

In Embodiment 3, at least while the first and second rollers 221 and 222 are approaching and separating from each other, the controller 50 performs a control so that the first and second rollers 221 and 222 are rotated at circumferential speeds little different from each other. This can prevent the surfaces of the first and second rollers 221 and 222 and the belt member 224 from being damaged. That is to say, Embodiment 3 is intended to appropriately control the circumferential speeds of the first and second rollers 221 and 222 (belt member 224).

However, if the circumferential speeds of the first and second rollers 221 and 222 are controlled only by torque control, the circumferential speeds could vary with changes in driving load. Accordingly, the first and second roller driving sections 22*m* and 22*n* are controlled by both the torque control and circumferential speed control. This makes it possible to rigorously control the circumferential speeds of the first and second rollers 221 and 222. It is therefore possible to minimize damages of the surfaces of the belt and rollers due to friction.

As described above, the fixation unit 22, which performs a control so that the circumferential speeds of the first and second rollers 221 and 222 are set little different from each other at least in the state where the first and second rollers 221 and 222 are approaching and separating from each other (at the approaching and separating operation), can minimize damages of the surfaces of the belt and rollers and moreover can sandwich and convey the paper P without causing slip of paper regardless of the toner image to be fixed to the paper P, thus implementing the fixing process which is less likely to cause paper wrinkling on the paper P.

That is to say, the image forming apparatus 1 including the thus-configured fixation unit 22 can perform good printing and image formation without causing paper wrinkling on the paper P at forming any kinds of images, including images of only characters, images of both characters and photographs, images with small margins, images with large margins, and the like.

Applications of the present invention are not limited to the aforementioned embodiments and can be properly changed without departing from the spirit of the invention.

The entire disclosure of Japanese Patent Application No. 2011-250276 filed on Nov. 16, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A fixation unit which allows paper with a toner image formed thereon to be fed between a first roller and a second roller for fixing the toner image on the sheet, the fixation unit comprising:

a drive controller for rotating the first and second rollers on different driving conditions, wherein the drive controller rotates the first roller at a constant circumferential speed at least in a state where the first and second rollers are in pressure contact with each other and rotates the second roller with a constant torque which is low enough for the second roller to stop rotating when the first roller stops rotating.

2. The fixation unit according to claim 1, wherein when paper having a toner layer composed of toner adhering to the entire surface thereof is fed between the first roller rotating at a driving force Fp and the second roller driven to rotate in response to the rotation of the first roller, the second roller is rotated by the drive controller with a constant torque which produces auxiliary driving force Fu satisfying a relation of Fp>Fu>Fp-Ft where Ft is a maximum force that can be transmitted from the first roller to the second roller through the sheet and the toner layer.

3. The fixation unit according to claim 1, wherein concerning rotational drive of the first and second rollers, the drive controller rotates the first roller and the second roller on a driving condition satisfying a relation of (driving power for rotating the first roller)>(driving power for rotating the second roller)>(driving power for rotating the first roller)−(lower limit of driving power for the first roller that causes paper wrinkling).

4. The fixation unit according to claim 1, further comprising a torque distribution adjustment controller for adjusting proportions of torque distributed to the first and second rollers concerning rotational drive of the first and second rollers, wherein the drive controller rotates the second roller with a torque according to the proportions of torque adjusted by the torque distribution adjustment controller.

5. The fixation unit according to claim 4, wherein the torque distribution adjustment controller adjusts the proportion of torque of the second roller to a proportion which is obtained as the lowest proportion that does not cause paper wrinkling when the torque proportion of the second roller is increased starting from 0% as a torque proportion of the second roller in the case of rotationally driving only the first roller.

6. The fixation unit according to claim 1, wherein each of the first and second rollers includes an elastic layer in the circumferential surface, and the elastic layer of the second roller is thicker than the elastic layer of the first roller, and the surface of the fed paper including the toner image thereon faces the second roller.

7. The fixation unit according to claim 1, further comprising: a heating roller for heating the second roller; and an endless belt member laid on the second roller and the heating roller, wherein the paper is fed between the first and second rollers with the belt member interposed therebetween.

8. The fixation unit according to claim 1, further comprising: a torque correction controller for correcting a value of torque for rotationally driving the second roller concerning the rotational drive of the first and second roller, wherein the torque correction controller corrects a value of torque for rotationally driving the second roller based on at least one of toner melting data and roller drive load data which are stored in a predetermined storage unit in advance, and the drive controller rotates the second roller with the torque corrected by the torque correction controller.

9. The fixation unit according to claim 8, wherein the toner melting data is data including at least one of temperature setting and circumferential speed of the second roller.

10. The fixation unit according to claim 8, wherein the roller drive load data is data concerning accumulated driving time of the fixation unit.

11. The fixation unit according to claim 1, further comprising:

a torque correction controller for correcting a value of torque for rotationally driving the second roller concerning the rotational drive of the first and second rollers; and a load data detector for detecting the roller drive load data concerning rotational drive of the first or second roller, wherein the torque correction controller corrects the value of torque for rotationally driving the second roller based on the roller drive load data detected by the load data detector, and the drive controller rotates the second roller with the torque corrected by the torque correction controller.

12. The fixation unit according to claim 11, wherein the load data detector detects driving power for rotating the first roller as the roller drive load data.

13. The fixation unit according to claim 1, wherein the drive controller rotates the second roller with different values of torque for rotationally driving the second roller in a state where the first and second rollers are in pressure contact with each other and a state where the first and second rollers are spaced apart from each other.

14. The fixation unit according to claim 1, wherein the drive controller rotates the second roller with different values of torque for rotationally driving the second roller in a state where the first and second rollers are in pressure contact with each other, a state where the first and second rollers are spaced apart from each other, and a state where the first and second rollers are approaching and separating from each other.

15. The fixation unit according to claim 13, wherein the value of torque for rotationally driving the second roller in the state where the first and second rollers are in pressure contact with each other is larger than the value of torque for rotationally driving the second roller in the state where the first and second rollers are spaced apart from each other.

16. The fixation unit according to claim 14, wherein the drive controller rotates the second roller at a same circumferential speed as the circumferential speed of the rotating first roller in the state where the first and second rollers are approaching or separating from each other by changing the value of torque for rotationally driving the second roller.

17. The fixation unit according to claim 14, wherein the drive controller rotates the second roller at a substantially same circumferential speed as the circumferential speed of the rotating first roller in the state where the first and second rollers are approaching or separating and in the state where the first and second rollers are spaced from each other by changing the value of torque for rotationally driving the second roller.

18. An image forming apparatus, comprising:

a fixation unit according to claim 1; and an image forming section for forming the toner image on the paper.

* * * * *